(12) United States Patent
Hagihara et al.

(10) Patent No.: US 6,318,152 B1
(45) Date of Patent: Nov. 20, 2001

(54) FUEL PROPERTY JUDGEMENT DEVICE FOR INTERNAL COMBUSTION ENGINE

(75) Inventors: Keizo Hagihara; Tadahiro Azuma; Hirofumi Ohuchi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,111

(22) Filed: Oct. 15, 1999

(30) Foreign Application Priority Data

May 24, 1999 (JP) .................................................. 11-143555

(51) Int. Cl.$^7$ .................................................. G01M 15/00
(52) U.S. Cl. ............................................................ 73/35.02
(58) Field of Search .............................. 73/35.02, 35.01, 73/35.03, 35.06, 35.07, 35.08, 116, 117.2, 117.3, 118.1

(56) References Cited

U.S. PATENT DOCUMENTS

| | | | |
|---|---|---|---|
| 5,537,978 | * 7/1996 | Watanabe et al. | 73/35.02 |
| 5,586,537 | * 12/1996 | Tomisawa et al. | 73/35.02 |
| 5,817,923 | * 10/1998 | Ohsaki et al. | 73/116 |
| 6,125,690 | * 10/2000 | Kitching | 73/35.02 |

FOREIGN PATENT DOCUMENTS 63-272935  11/1988 (JP).
2-308945  12/1990 (JP).

* cited by examiner

Primary Examiner—Eric S. McCall
(74) Attorney, Agent, or Firm—Sughrue, Mion, Zinn, Macpeak & Seas, PLLC (57) ABSTRACT

To provide a fuel property judgement device for an internal combustion engine, in which, without increasing costs, fuel property is judged earlier and an optimum control suitable for the fuel property is carried out earlier whereby the predicted degradation of the controllability at the time of starting operation, caused by the difference in fuel property, immediately after the start and during a transient period may be prevented, there are provided a unit for detecting an initial combustion at the time of starting operation of the internal combustion engine, a unit for counting a turn-on number of a crank angle signal until the initial combustion is detected, a unit for setting a standard number, a unit for comparing the turn-on number with the standard number, and a unit for determining the fuel property on the basis of a comparison result.

9 Claims, 8 Drawing Sheets

FUEL PROPERTY JUDGEMENT DEVICE FOR INTERNAL COMBUSTION ENGINE

BACKGROUND OF THE INVENTION

1. Field of the Invention

The present invention relates to a fuel property judgement device used in an internal combustion engine, and more particularly to a fuel property judgement device for an internal combustion engine, which may rapidly determine fuel property at a starting operation with a high reliability to prevent a degradation of the controllability without increasing a cost.

2. Description of the Related Art

A fuel controlling system at the time of starting operation of an internal combustion engine (engine) or immediately after the start thereof is conventionally known which detects an engine coolant water temperature (engine temperature) and determines an amount of fuel at the time of the start in response to the engine temperature, or which determines an increment amount of fuel in response to the engine temperature at the time of starting operation and gradually decreases the fuel increment amount on the time basis immediately after the start.

Also, an ignition timing controlling system immediately after the start of the engine is conventionally known which controls the ignition timing on an angular advance side to the standard value in response to the detected engine temperature.

Furthermore, an idle air amount controlling system immediately after the start of the engine or during the engine starting period is conventionally known which determines an amount of air at the time of starting operation in response to the detected engine temperature or which determines an air amount increment value in response to the engine temperature at the time of starting operation operation and gradually decreases the air amount increment value on the time basis immediately after the start.

However, in such conventional internal combustion engine controlling systems, the fuel property is not particularly taken into consideration in the fuel amount control, the ignition timing control and the idle air amount control, and the fuel amount at the time of operation start and immediately after the start, the ignition timing and the idle air amount are selected to be optimized for matching the specific fuel property.

Also, in a conventional transient fuel controlling system for an internal combustion engine, an acceleration condition of the engine is detected from a change of throttle valve opening degree or a change of an air intake amount, a fuel supply rate is increased at the time of start of the acceleration by a acceleration increment means and thereafter -the acceleration increment amount is gradually decreased. At this time, the acceleration increment rate is variably set by using any of the intake amount, the throttle valve opening degree, the engine temperature, an engine rpm as a parameter.

In the same manner, a conventional ignition timing controlling system for an internal combustion engine is known which detects the acceleration condition of the engine from a change of a throttle valve opening degree or a change of an intake air amount and increases a delay angle at the time of ignition during the acceleration period.

However, in the same manner as described above, in such conventional internal combustion engine controlling systems, the fuel property is not particularly taken into consideration in the fuel amount control and the ignition timing control, the air/fuel ratio or the ignition timing during the transient state is selected to be optimized for matching the specific fuel property.

On the other hand, recently, an internal combustion engine controlling system which may always keep the stable combustion irrespective of the fuel property has been demanded. A variety of fuel property judgement devices that indirectly determine the fuel property has been conventionally proposed.

For instance, a case using heavy gasoline is exemplified as a complete example in which difference in fuel property raises a problem.

The heavy gasoline is gasoline whose extraction temperature is high, whose gasoline vaporization pressure (RVP) is low, and whose specific weight and octane value are high in comparison with regular gasoline.

However, there is no distinction between the heavy gasoline and the regular gasoline in standards. Also, there is no distinction in feeding at a gasoline station like the distinction between the regular gasoline and the high octane value gasoline.

Accordingly, there is a possible case where the heavy gasoline is fed to a vehicle installed with an internal combustion engine controlling system which performs the fuel amount control, the ignition timing control and the idle air amount control which are matched for the regular gasoline.

In the case where the heavy gasoline is fed to the above-described vehicle, the problem in travel is a hesitation in acceleration or instability in engine rpm at the time of starting operation and immediately after the start. Furthermore, impossibility of start of the engine or engine stop would occur, resulting in degradation in emission of exhaust gas.

The cause of the above-described disadvantage would be as follows. Due to the fact that the vapor pressure of the heavy gasoline is low and the fuel is stuck to the intake pipe so that a substantial fuel supply amount is decreased, the substantial air/fuel ratio is increased at the time of starting operation and immediately after the start, resulting in incomplete combustion.

Accordingly, as in, for example, Japanese Patent Application Laid-Open No. Hei 2-308945, a device for judging the fuel property on the basis of an engine cooling temperature (engine temperature) and a cranking time has been conventionally proposed.

However, according to the fuel property judgement device disclosed in the above-described publication, it is impossible to detect the fuel property during a period from the start of the stable rpm in accordance with a starter signal until the start of the engine itself.

Also, according to the fuel property judgement device disclosed in the above-described publication, when a voltage of a battery is lowered, there is a disadvantage that the rpm of the engine according to the starter signal is somewhat lower than that in the regular condition and the cranking time is prolonged more.

Also, as in, for example, Japanese Patent Application Laid-Open No. Sho 63-272935, as another fuel property judgement device, it is known to detect the fuel property from a period of the complete combustion at the time of starting operation at a low temperature.

Also, recently, a fuel property judgement device using a sensor for directly detecting the gasoline property has been developed. For example, as in, Japanese Patent Application Laid-open No. Hei 6-167474, it is known to use a static capacitance sensor utilizing a difference in specific induction ratio of the gasoline property and a gasoline temperature sensor.

Furthermore, as a fuel property judgement device using a gasoline property sensor, as in, for example, Japanese Patent Application Laid-Open No. Hei 6-81698, it is known to use a sensor utilizing a difference in refractive index of light due to the gasoline property.

However, such conventional devices suffer from a problem causing an increased cost, complication of components and a space problem of installation. Those devices are not always practical countermeasures.

As described above, according to each conventional fuel property judgement device for an internal combustion engine, the adverse affect of the difference in fuel property is not taken into consideration with respect to the controllability during a transient stage such as the start or acceleration in fuel amount control, ignition timing control and idle air amount control.

Accordingly, there is a fear that the engine would not be started at the time of starting operation of the engine for the fuel other than the specified fuel property. In addition, there are problems that the engine would be at an engine stop immediately after the start of the engine and the controllability would be considerably degraded at the transient operation of the engine.

SUMMARY OF THE INVENTION

In order to overcome the above-noted defects, an object of the present invention is to provide a fuel property judgement device for an internal combustion engine, in which, without increasing costs, fuel property is determined earlier and an optimum control suitable for the fuel property is carried out earlier whereby the predicted degradation of the controllability at the time of starting operation, immediately after the start and during a transient period may be prevented in advance.

In order to attain this and other objects, according to the present invention, there is provided a fuel property judgement apparatus for an internal combustion engine, comprising: a crank angle sensor for generating a crank angle signal corresponding to an rpm of the internal combustion engine and a crank angle position; a starter switch for outputting a start signal at the time of starting operation of the internal combustion engine; an initial combustion detecting means for detecting an initial combustion at the time of starting operation of the internal combustion engine in response to the start signal; a turn-on number counting means for counting a turn-on number of the crank angle signal during a period from the operation start of the internal combustion engine to the detection of the initial combustion; a standard number setting means for setting a standard number which is a judgement standard for the fuel property of the internal combustion engine; a turn-on number comparing means for comparing the turn-on number with the standard number; and a fuel property judgement means for determining the fuel property on the basis of the comparison result of the turn-on number comparing means.

Further, in the fuel property judgement apparatus according to the present invention, the fuel property judgement means determines that the fuel property of the internal combustion engine is of a heavy gasoline type in the case where it is judged that the turn-on number is equal to or greater than the standard number on the basis of the comparison result of the turn-on number comparing means, and determines that the fuel property of the internal combustion engine is of a regular gasoline type in the case where it is judged that the turn-on number is smaller than the standard number on the basis of the comparison result of the turn-on number comparing means.

Still further, the fuel property judgement apparatus according to the present invention is comprised of: a temperature sensor for detecting a coolant water temperature of the internal combustion engine; and a start temperature judgement means for determining a temperature condition at the time of starting operation of the internal combustion engine on the basis of the start signal and the coolant water temperature, wherein the start temperature judgement means includes: a standard temperature range setting means for setting a standard temperature range which is a judgement standard for the temperature condition; and a coolant water temperature comparing means for comparing the coolant water temperature at the time of starting operation of the internal combustion engine with the standard temperature range, whereby the start temperature judgement means validates the judgement result of the fuel property judgement means on the basis of the turn-on number in the case where it is judged that the coolant water temperature falls within the standard temperature range on the basis of a first comparison result of the coolant water temperature comparing means.

Yet further, in the fuel property judgement apparatus according to the present invention, the start temperature judgement means invalidates the judgement result of the fuel property judgement means on the basis of the turn-on number in the case where it is judged that the coolant water temperature is out of the standard temperature range by a second comparison result of the coolant water temperature comparing means and determines that the fuel property of the internal combustion engine is of a regular gasoline type.

Furthermore, in the fuel property judgement apparatus according to the present invention, a lower limit value of the standard temperature range is set in correspondent with the coolant water temperature at the time of starting operation in an extremely cold place, and an upper limit value of the standard temperature range is set corresponding to the coolant water temperature at the time of warming-up of the internal combustion engine.

Further, in the fuel property judgement apparatus according to the present invention, the initial combustion detecting means detects the initial combustion on the basis of a periodic change of turn-on timing of the crank angle signal.

Still further, in the fuel property judgement apparatus according to the present invention, the initial combustion detecting means detects the initial combustion in the case where the periodic change of the turn-on timing of the crank angle signal exhibits a predetermined value or more of decrease.

Yet further, the fuel property judgement apparatus according to the present invention is comprised of an ion current detecting device for detecting an ion current generated in the vicinity of an ignition plug at the time of an ignition control operation of the internal combustion engine, wherein the initial combustion detecting means detects the initial combustion on the basis of the ion current.

Yet further, in the fuel property judgement apparatus according to the present invention, the initial combustion detecting means detects the initial combustion in the case where the detection level of the ion current exhibits a predetermined value or more.

DETAILED DESCRIPTION OF THE PREFERRED EMBODIMENTS

Embodiment 1

Embodiment 1 of the present invention will now be described with reference to the drawings.

Figure 1:
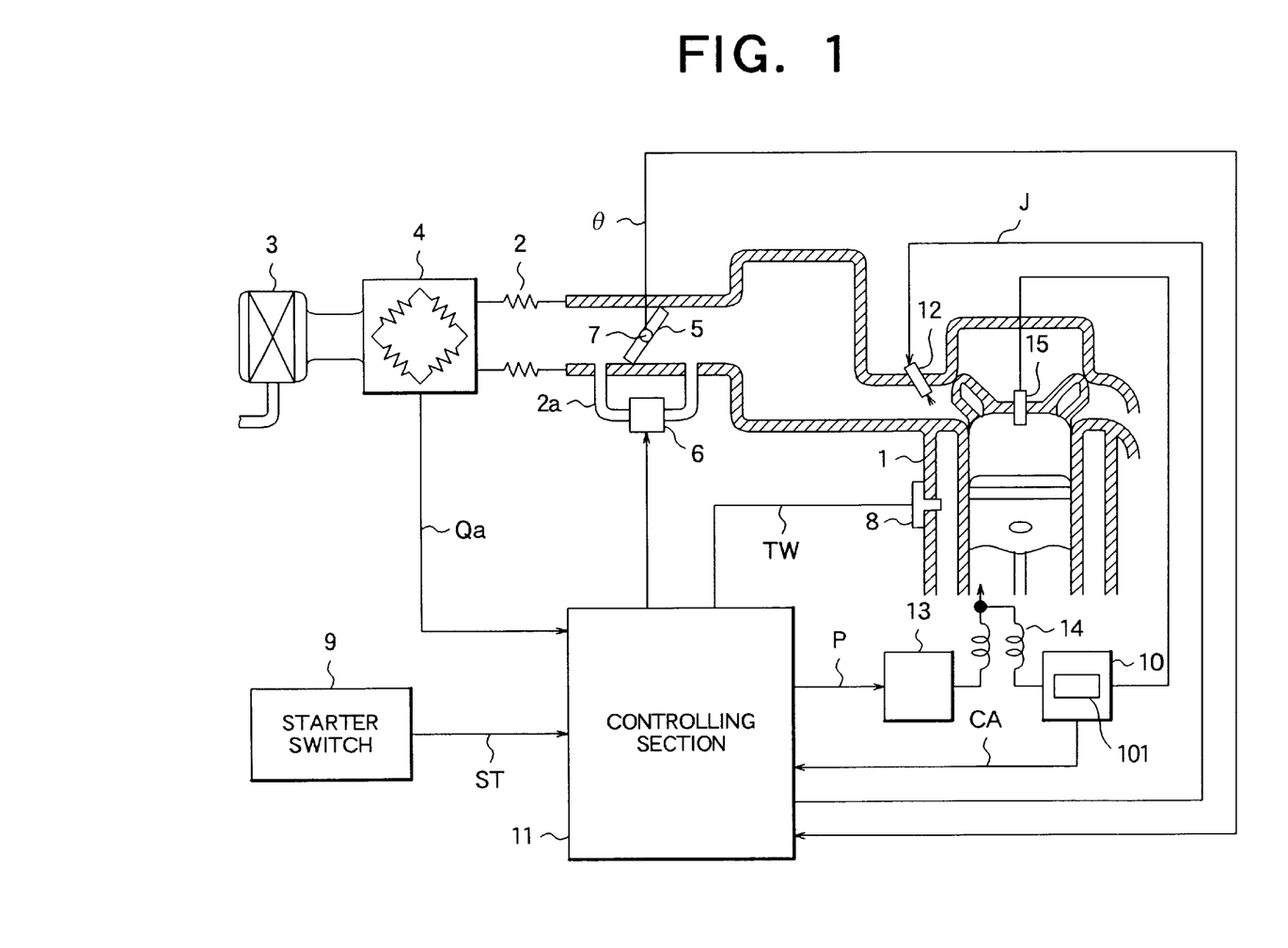
FIG. 1 is a block diagram schematically showing embodiment 1 of the present invention.
Figure 2:
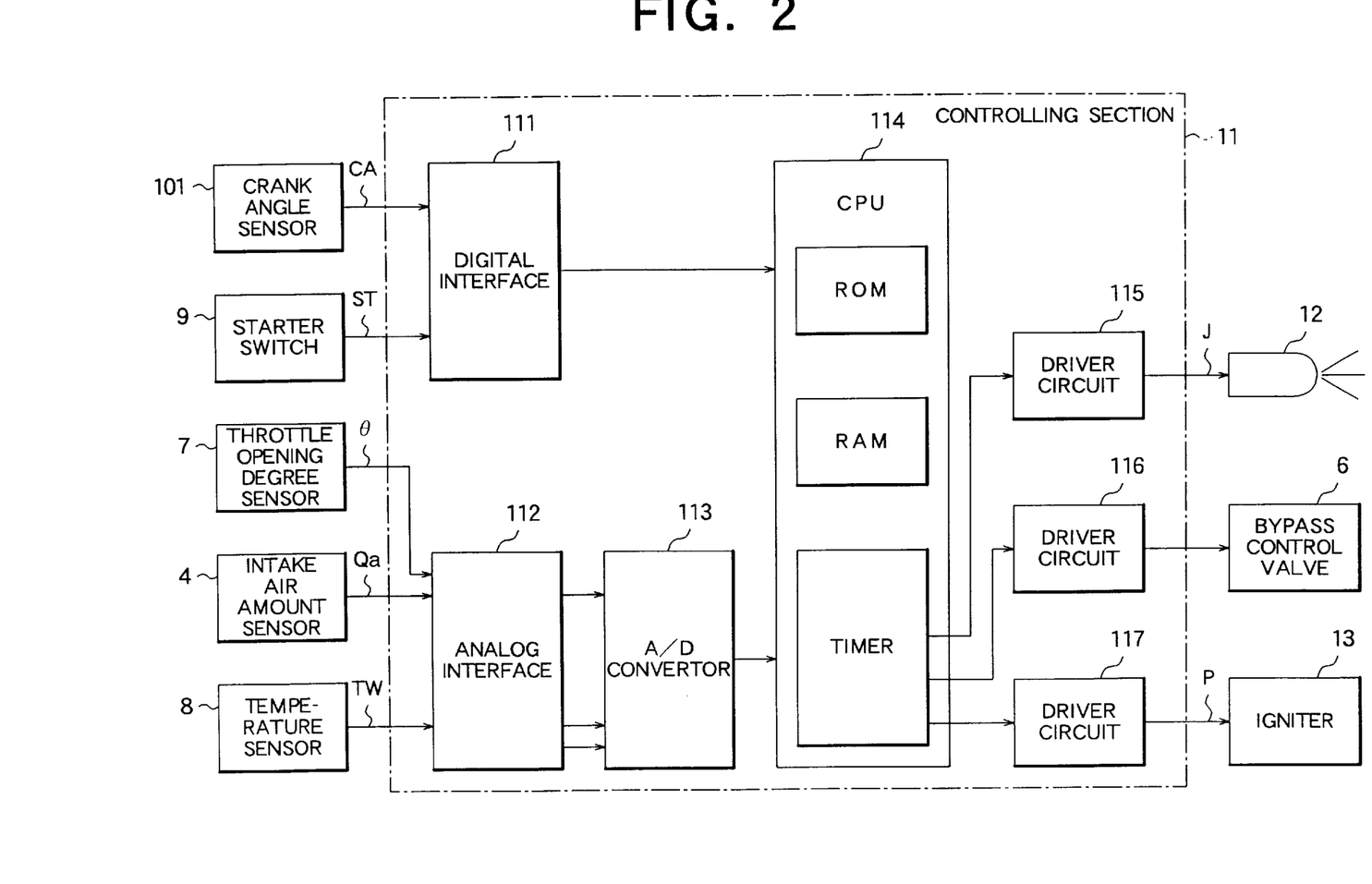
FIG. 2 is a block diagram showing the structure of a controlling section in FIG. 1.
Figure 3:
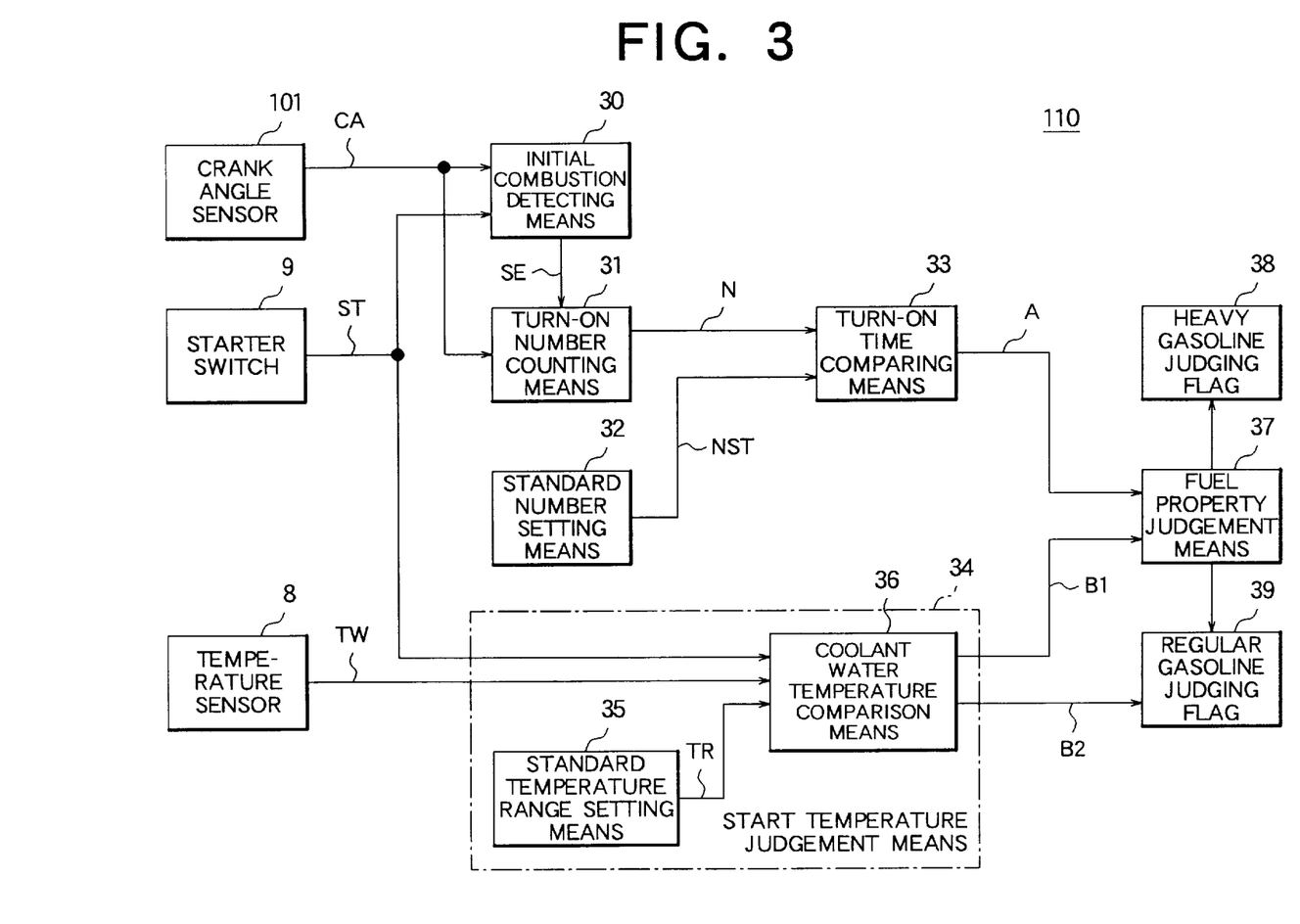
FIG. 3 is a functional block diagram showing a fuel property judgement device in accordance with Embodiment 1 of the present invention.

FIG. 1 is a block diagram showing Embodiment 1 of the present invention together with an internal combustion engine controlling apparatus. FIG. 2 is a block diagram showing the structure of a controlling section 11 with in FIG. 1, and FIG. 3 is a functional block diagram showing a structure of a fuel property judgement device 110 within the controlling section 11.

In FIG. 1, an intake pipe 2 is connected to an engine 1, and an air cleaner 3 is provided at an inlet of the intake pipe 2.

An intake air amount sensor 4, a throttle valve 5 and an injector 12 are provided within the intake pipe 2.

Also, a bypass pipe 2a for connecting the upstream side and downstream side of the throttle valve 5 is provided in the intake pipe 2. A bypass control valve 6 for controlling an opening degree of the bypass pipe 2a is provided in the bypass pipe 2a.

A throttle opening degree sensor 7 detects an opening degree θ of the throttle valve 5. A temperature sensor 8 detects a coolant water temperature TW of the engine 1 as an engine temperature. A start switch 9 detects a start condition of the engine 1 to output a start signal ST.

A distributor 10 incorporates a crank angle sensor 101 to distribute a high voltage for ignition to each spark plug 15.

The crank angle sensor 101 produces a crank angle signal CA composed of pulse rows representative of an engine rpm and a crank angle position.

The controlling section 11 composed of a microcomputer produces a drive signal of each actuator on the basis of each sensor information. For example, the controlling section 11 drives an injector 12 in accordance with a fuel injection signal J, and drives an igniter 13 and an ignition coil 14 in accordance with an ignition signal P.

Namely, the controlling section 11 duty drives the injector 12 to control the fuel amount on the basis of the detection signals of the respective sensors 4, 7, 8, and 101 and the start signal ST from the start switch 9, turns the igniter 13 on or off to control the supply period and the ignition timing of the ignition coil 14, and further drives the bypass control valve 6 to control the idle rpm (idle intake air).

In FIG. 2, a digital interface 111 serves to input detection signals (digital signals) from the crank angle sensor 101 and the start switch 9 into a CPU 114.

An analog interface 112 serves to input detection signals (analog signals) from the throttle opening degree sensor 7, the intake air amount sensor 4 and the temperature sensor 8 into an A/D convertor 113.

The A/D convertor 113 converts the above-described analog signals through A/D conversion and inputs them into the CPU 114.

The CPU 114 incorporates a ROM, a RAM, a timer and the like and controls driver circuits 115 to 117 on the basis of the above-described input signals.

The driver circuits 115 to 117 drive the injector 12, the bypass control valve 6 and the igniter 13, respectively.

In FIG. 3, the fuel property judgement device 110 is provided with an initial combustion detecting means 30, a turn-on number counting means 31, a standard number setting means 32, a turn-on number comparing means 33, a start temperature judgement means 34, a fuel property judgement means 37, a heavy gasoline judgement flag 38 and a regular gasoline judgement flag 39.

The initial combustion detecting means 30 starts in response to the start signal ST to detect the initial combustion at the time of starting operation of the internal combustion engine on the basis of a periodical change of an on-timing of the crank angle signal CA. Namely, the initial combustion detecting means 30 detects the initial combustion in the case where the periodic change of the crank angle signal CA exhibits a decrease which is equal to or higher than a predetermined value and outputs an initial combustion detecting signal SE.

The turn-on number counting means 31 counts the turn-on number N (pulse number) of the crank angle signal CA during a period from the start of the operation of the internal combustion engine until the detection of the initial combustion.

The standard number setting means 32 sets a standard number NST that is the judgement basis of the fuel property of the internal combustion engine.

The turn-on number comparing means 33 compares the turn-on number N with the standard number NST to output a comparison result A of level H in the case where N>NST is met and outputs a comparison result A of level L in the case of N<NST.

The fuel property judgement means 37 determines the fuel property on the basis of the comparison result A of the turn-on number comparing means 33 and sets the heavy gasoline judgement flag 38 or the regular gasoline judgement flag 39 at "1".

Namely, the fuel property judgement means 37 determines that the fuel property of the internal combustion engine is the heavy gasoline to set the heavy gasoline judgement flag 38 at "1" in the case where the comparison result A is at level H and the turn-on number N is equal to or greater than the standard number NST (N≧NST).

Also, the fuel property judgement means 37 determines that the fuel property of the internal combustion engine is the regular gasoline to set the regular gasoline judgement flag 39 at "1" in the case where the comparison result A is at level L and the turn-on number N is smaller than the standard number NST (N<NST).

Incidentally, in the initial condition, the respective judgement flags 38 and 39 are cleared as "0".

If one of the respective judgement flags 38 and 39 is set at "1", the controlling section 11 (see FIG. 1) refers to the respective judgement flags 38 and 39 (fuel property) and calculates a control parameter for the engine 1 in response to the fuel property.

The start temperature judgement means 34 within the fuel property judgement device 110 is provided with a standard temperature range setting means 35 and a coolant water temperature comparing means 36 for judging a temperature condition at the time of starting operation of the internal combustion engine on the basis of the start signal ST and the coolant water temperature TW.

The standard temperature range setting means 35 within the start temperature judgement means 34 sets a standard temperature range TR which becomes a judgement standard for the temperature condition.

Also, the coolant water temperature comparing means 36 within the start temperature judgement means 34 compares the coolant water temperature TW at the time of starting operation of the internal combustion engine with the standard temperature range TR.

The start temperature judgement means 34 effectuates the judgement result of the fuel property judgement means 37 on the basis of the turn-on number N (comparison result A) in the case where the coolant water temperature TW is judged to fall within the standard temperature range TR on the basis of the comparison result B1 of the coolant water comparing means 36.

Namely, the start temperature judgement means 34 invalidates the judgement result of the fuel property judgement means 37 on the basis of the turn-on number N (comparison result A) and determines that the fuel property of the internal combustion engine is the regular gasoline to set the regular gasoline judgement flag 39 at "1" in the case where it is judged by the second comparison result B2 of the coolant water temperature comparing means 36 that the coolant water temperature TW is out of the range of the standard temperature range TR.

Incidentally, a lower limit value TWL of the standard temperature range TR is set corresponding to the coolant water temperature at the time of starting operation in an extremely cold place and an upper limit value TWH of the standard temperature range TR is set corresponding to the coolant water temperature at the time of warming-up of the internal combustion engine.

Also, for example, the coolant water comparing means 36 is provided with a first comparing means for generating a comparison output of level H when TW≦TWH and level L when TW>TWH and a second comparing means for generating a comparison output of level H when TW≧TWL and level L when TW<TWL.

Accordingly, the coolant water temperature comparing means 36 outputs the first comparison result B1 in the case where both of the comparison outputs of the first and second comparing means are at level H, and outputs the second comparison result B2 in the case where the comparison result of either first or second comparing means is at level L.

Namely, if the first comparison result B1 is outputted by the respective comparison outputs of level H for the lower limit value TWL and level H for the upper limit value TWH, it deems that the coolant water temperature TW falls within the standard temperature range TR (the cooling-down condition under the circumstances other than the extremely cold place) and the volatility of the heavy gasoline is low. Accordingly, in order to perform the control in correspondence with the heavy gasoline, the fuel property is determined by the comparison result A on the basis of the turn-on number N of the crank angle signal CA.

Also, if the second comparison result B2 is outputted by the comparison result of level L for the upper limit value TWH, the coolant water temperature TW is high, the engine 1 is sufficiently in the warmed-up condition and the volatility affect is small irrespective to the fuel property. Accordingly, it is determined that the regular gasoline is used irrespective of the comparison result A on the basis of the turn-on number N.

Also, if the second comparison result B2 is outputted by the comparison result of level L for the lower limit value TWL, the coolant water temperature TW is low, the engine 1 is in a cooled-down condition under the low temperature circumstances at the extremely cold place, and even the volatility of the regular gasoline is low. Accordingly, the fuel property is likely to be misjudged and under such low temperature circumstances, the heavy gasoline is never used. Thus, the judgement is the regular gasoline irrespective of the comparison result A on the basis of the turn-on number N.

The operation of the fuel property judgement in accordance with Embodiment 1 of the present invention shown in FIGS. 1 to 3 will now be described with reference to a flowchart shown in FIG. 4.

Figure 4:
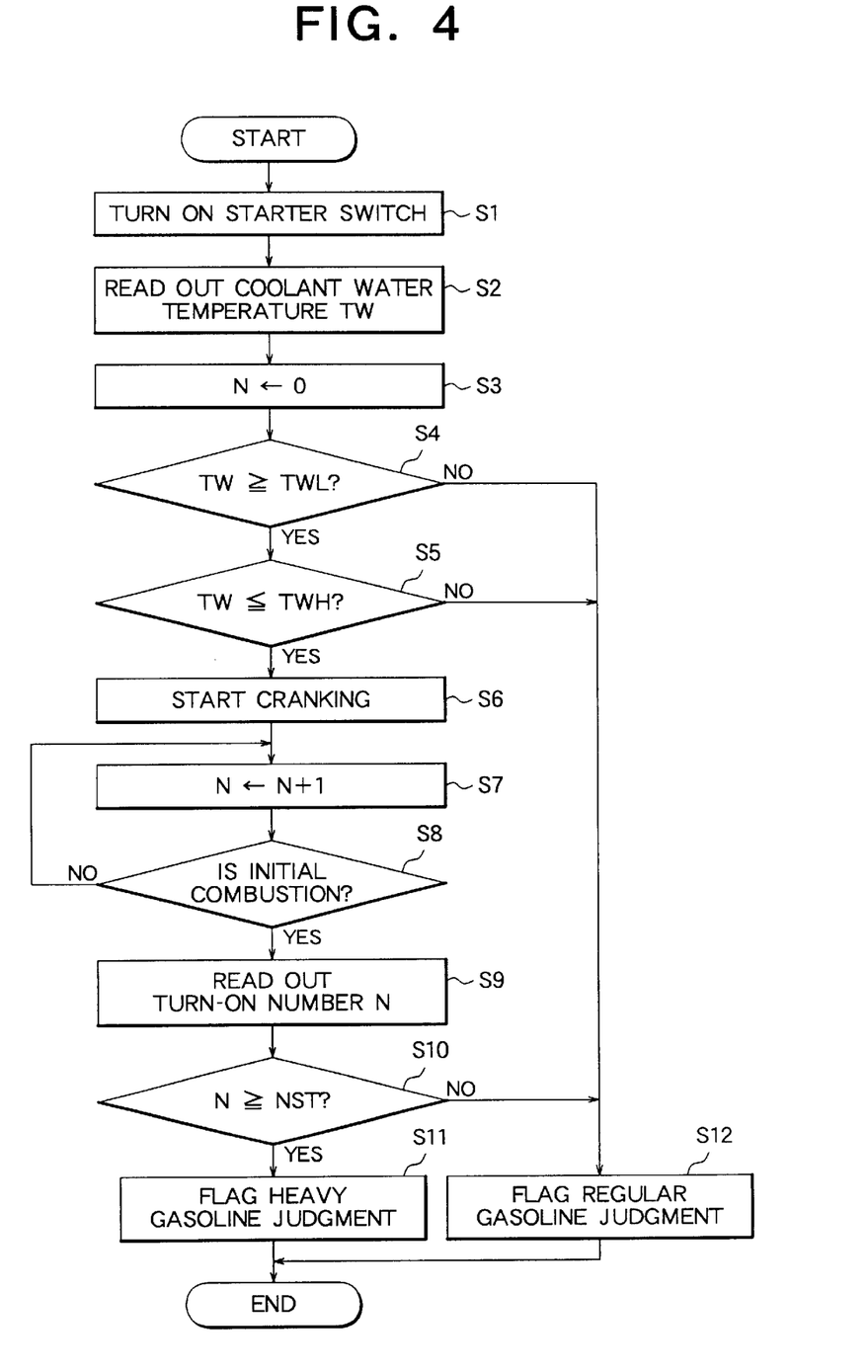
FIG. 4 is a flowchart showing a fuel property judging operation according to Embodiment 1 of the present invention.

In FIG. 4, first of all, when the start switch (ignition switch) 9 is turned on (step S1), the fuel property judgement device 110 is started from the very moment the start signal ST has been generated. The start temperature judgement means 34 reads out the cooling temperature TW (step S2).

Also, the fuel property judgement device 110 initializes (zero clear) the counter value (the turn-on number N of the crank angle signal CA) within the turn-on number counting means 31 in response to the start signal ST (step S3).

Subsequently, in order to compare the coolant water temperature TW with the standard temperature range TW, first of all, the coolant water comparing means 36 within the start temperature judgement means 34 determines whether or not the cooling temperature TW is equal to or higher than the lower limit value TWL of the standard temperature range TR (whether or not it is in the low temperature condition in the extremely cold place) (step S4).

If, in step S4, it is judged to be TW≧TWL (i.e., YES), which is not in the low temperature condition in the extremely cold place, then, it is judged whether or not the coolant water temperature TW is equal to or lower than the upper limit value TWH of the standard temperature range TR (whether or not the engine 1 is in the warmed-up condition) (step S5).

If, in step S5, it is judged to be TW≦TWH (i.e., YES), in which the engine 1 is not in the warmed-up condition, then, it is deemed that the coolant water temperature TW falls within the standard temperature range TR (the judgement condition for the fuel property is established). The operation moves to the next step S6.

On the other hand, if, in step S4, the relationship of TW<TWL (i.e., NO) is established or in step S5, the relationship of TW>TWH (i.e., NO) is established, without waiting for the next cranking start (step S6), it is deemed that the coolant water temperature TW is out of the standard temperature range TR (the judgement condition for the fuel property is not established). The following fuel property judgement steps S7 to S11 are invalidated.

Thus, in the case where the judgement condition for the fuel property is not established, the operation is advanced immediately to the step S12. The regular gasoline judgement flag 39 is forcibly turned on (set at "1") to finish the process routine shown in FIG. 4.

Namely, in step S4, if the relationship of TW<TWL (cooled-down condition in the extremely cold place) is established, the heavy gasoline is never practically used in the extremely cold place. Accordingly, it is deemed that the regular gasoline is used, and the control of the engine 1 is performed.

Also, if the relationship of TW>TWH (sufficiently warmed-up condition) is established, the condition that even the heavy gasoline has the volatility is obtained. Accordingly, it is deemed that the gasoline that is used is the regular gasoline irrespective of the fuel property. Thus, the engine 1 is controlled.

In the warmed-up condition of the engine 1, even if it is determined that the heavy gasoline is the regular gasoline, there is no fear that the controllability at the time of starting operation, immediately after the start and during the transient condition is degraded. There is no particular problem.

If the judgement condition for the fuel property is established in steps S4 and S5 and the engine 1 is actually started by the starter drive so that the cranking is started (step S6), the counter value (turn-on number N) within the turn-on number counting means 31 is incremented at the same time with the cranking or in a short period time after that (step S7).

Incidentally, in step S7, the crank angle signal CA concerning the cylinder into which the fuel has not yet been sucked and the cylinder which has not yet been ignited is excluded from the counting of the turn-on number N in accordance with information of the drive signal J for the injector 12 and the ignition signal P for the igniter 13.

Subsequently, it is judged whether or not the initial combustion detecting means 30 detects the initial combustion during the cranking on the basis of the absence/presence of the initial combustion detection signal SE (step S8). If it is judged that the initial combustion is not detected (i.e., NO), the operation is returned back to step S7.

Also, instep S8, if it is judged that the initial combustion is detected (i.e., YES), the turn-on number comparing means 33 reads out the turn-on number N from the turn-on number counting means 31 (step S9) and judges whether or not the turn-on number N is equal to or greater than the standard number NST (judgement standard for the heavy gasoline) (step S10).

Incidentally, the standard number NST is set at an optimum value in correspondence with the coolant water temperature TW of the engine 1 or the intake air temperature.

In step S10, if it is judged that the relationship of N≧NST (i.e., YES) is established, the comparison result A of level H is outputted from the turn-on number comparing means 33.

In this case, since the turn-on number N is large from the start to the initial combustion and the volatility of the used fuel is low, it is deemed that the possibility of the heavy gasoline is high, the heavy gasoline judgement flag 38 is turned on as the judgement result of the fuel property (step S11) to thereby finish the process routine shown in FIG. 4.

Also, in step S10, if the relationship of N<NST (i.e., NO) is established, the comparison result A of level L is outputted from the turn-on number comparing means 33.

In this case, since it is deemed that the turn-on number N from the start to the initial combustion is small and the volatility of the used fuel is high, the regular gasoline judgement flag is turned on as the judgement result for the fuel property (step S12) to thereby finish the process routine shown in FIG. 4.

Incidentally, in a general internal combustion controlling apparatus, a first constant (control amount) is matched for the regular gasoline so that the fuel amount, the ignition timing and the idle air amount are at optimum at the time of starting operation, immediately after the start and during the transient period.

Accordingly, in the case where the result represents the regular gasoline from the comparison result A, the first constant is used without any change, and in the case where the result represents the heavy gasoline, the fuel amount is increased more than the first constant, the delay angle amount of the ignition timing is corrected on the advance angle side, the idle air amount is increased and so on so that the air/fuel ratio A/F is set on the more enriched side than that in the case of the regular gasoline.

A specific operation of the initial combustion detecting means 30 for detecting the initial combustion on the turn-on periodical change of the crank angle signal CA will now be described with reference to a timing chart shown in FIG. 5.

Figure 5:
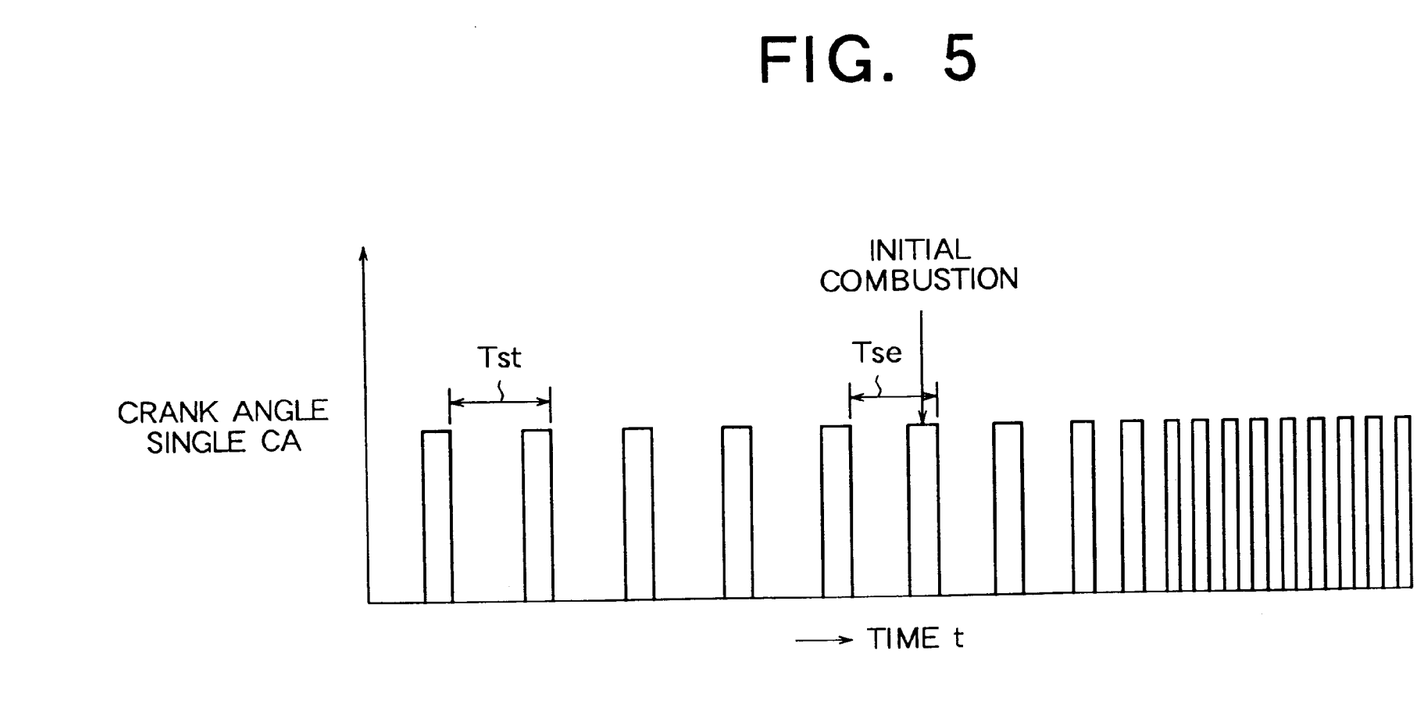
FIG. 5 is a timing chart showing an initial combustion detecting operation in accordance with Embodiment 1 of the present invention.

FIG. 5 shows a time change of pulse waveforms of the crank angle signal CA on the time basis.

In FIG. 5, the initial combustion detecting means 30 detects the initial combustion by utilizing the fact that the pulse cycle Tst of the crank angle signal CA by the starter is substantially the same at the start operation of the engine 1.

Namely, when the initial combustion is started by the engine 1, since some kind of engine torque is generated, the turn-on cyclic period of the crank angle signal CA is shortened from Tst to Tse although that is slight.

Therefore, the initial combustion detecting means 30 sets the standard cycle for the initial combustion in view of a minute variation ΔTs (noise component) of the on-cycle Tst of the crank angle signal CA by the starter at the time of starting operation, and outputs the initial detection signal SE, assuming that the initial combustion is started in the case where the on-cycle of the crank angle signal CA is shorter than the standard cycle.

Otherwise, the initial combustion detecting means 30 sets the standard variation for the initial combustion judgement in view of the variation ΔTs of the on-cycle Tst by the starter at the time of starting operation, and outputs the initial detection signal SE, assuming that the initial combustion is started when the periodic change of the on-timing of the crank angle signal CA is decreased equal to or more than the standard variation amount.

First of all, the initial combustion detecting means 30 calculates a cycle rate RTs of an (N−1)-th cycle Tst(N−1) to an N-th cycle Tst(N) from the following equation (1), assuming the initial value of the cycle Tst (N) derived at every N turn-on number as Tst (1) in the crank angle signal CA by the starter at the time of starting operation:

$$RTs = Tst(N)/Tst(N-1) \tag{1}$$

Then, when the cyclic rate RTs is smaller than a predetermined value, the turn-on number N at the initial combustion detection is used as the index of the initial combustion start timing, assuming that the engine 1 starts the initial combustion.

Thus, it is possible to positively obtain the turn-on number N from the starting operation until the initial combustion start while positively detecting the initial combustion of the engine 1.

Accordingly, the turn-on number N from the starting operation to the initial combustion is used as information representative of the startability of the engine 1 corresponding to the fuel property so that the fuel property may be determined correctly.

Namely, in the case of the heavy gasoline having the low volatility at a low temperature, the turn-on number N of the crank angle signal CA at the time of engine start is increased, and in the case of the regular gasoline having high volatility, the turn-on number N is decreased so far as it is in the low temperature condition in the extremely cold place. Accordingly, if the turn-on number N is compared with the standard number NST, it is possible to make a decision of the fuel property by using the turn-on number N as an index.

Also, the fuel property judgement device 110 does not count the cranking time from the start until the initial combustion but counts the turn-on number N of the crank angle signal CA so that the fuel property may be determined earlier.

Also, even if the cranking rpm is decreased due to the reduction of the battery voltage, it is possible to positively determine the fuel property.

Accordingly, it is possible to realize an optimum control suitable for the fuel property, and it is possible to prevent a start failure or an engine stop by enhancing the controllability at the time of starting operation, immediately after the start or during a transient period.

Furthermore, since the judgement result of the fuel property judgement means 37 is validated in response to the condition of the coolant water temperature TW, in the condition that the judgement of the fuel property is not necessary, it is possible to prevent the unnecessary judgement process.

Embodiment 2

Incidentally, in the above-described Embodiment 1, the initial combustion is detected on the basis of the on-cycle change of the crank angle signal CA but it is possible to detect the initial combustion on the basis of an ion current generated in the vicinity of the ignition plug 15 (see FIG. 1).

Hereinafter, Embodiment 2 of the present invention for detecting the initial combustion from the ion current will be described with reference to the drawings.

Figure 6:
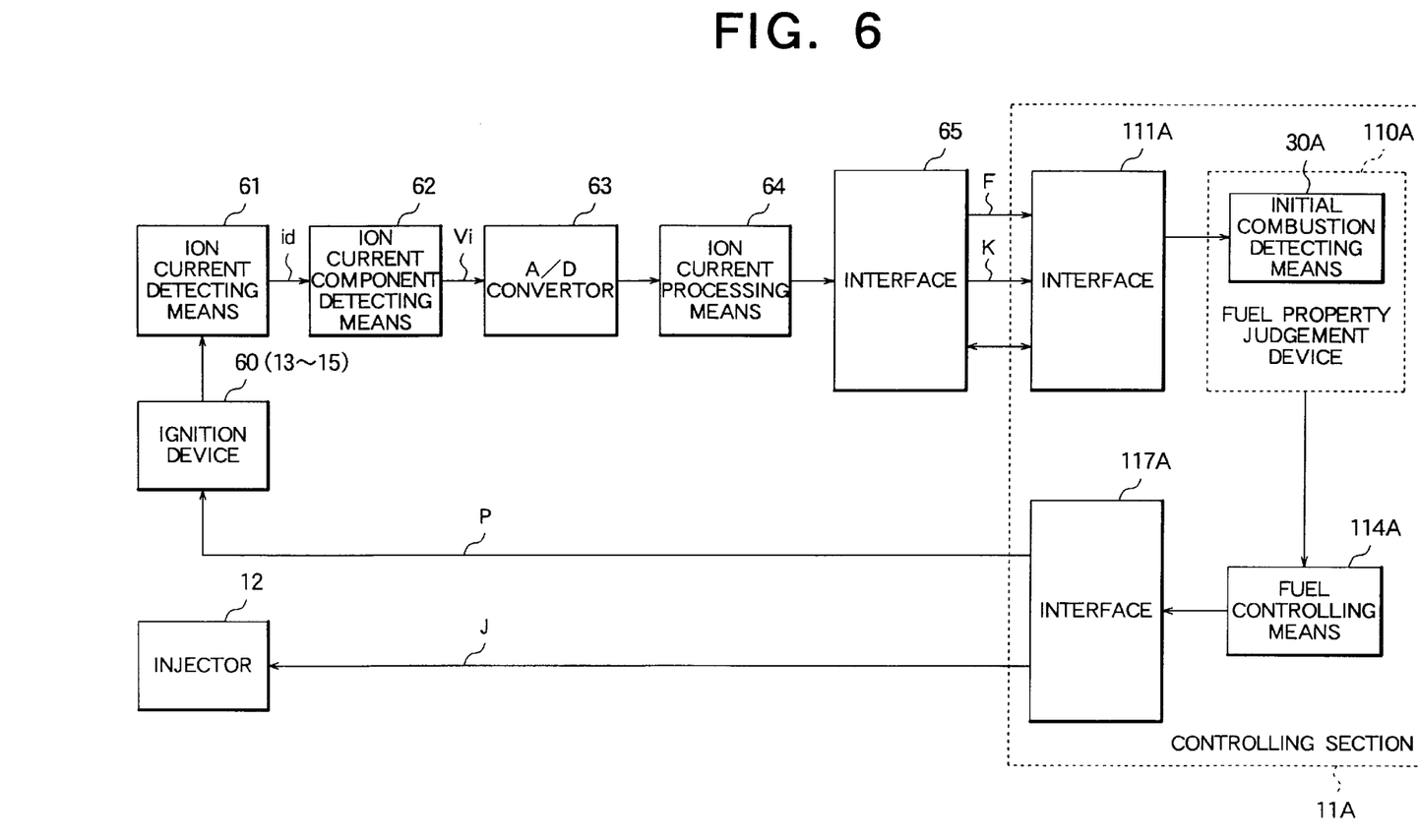
FIG. 6 is a block diagram schematically showing Embodiment 2 of the present invention.

FIG. 6 is a block diagram showing a peripheral structure of the initial combustion detecting means 30A in accordance with Embodiment 2 of the present invention.

In FIG. 6, the same reference numerals are used to indicate the same components as those shown in FIGS. 1 to 3, and the reference numerals with "A" are used to indicate the like components as those described above. The detailed explanation therefor will be omitted.

In this case, the controlling section 11A is provided with a fuel controlling means 114A composed of a CPU in association with the fuel property judgement device 110A.

The initial combustion detecting means 30A within the fuel property judgement device 110A receives through an interface 111A information associated with the ion current i (to be described later) to detect the initial combustion in the case where the detection level of the ion current i exhibits a predetermined value or more.

The fuel controlling means 114A within the controlling section 11A calculates the control amount of the engine 1 on the basis of the judgement result of the fuel property judgement device 110A and outputs through an interface 117A a fuel injection signal J for the injector 12 and an ignition signal P for an ignition device 60.

The fuel ignition device 60 includes the above-described igniter 13, the ignition coil 14 and the ignition plug 15 (see FIG. 1).

The controlling section 11A is provided with ion current detecting devices 61 to 65 associated with the ignition device 60.

An ion current detecting means 61 within the ion current detecting device detects for each cylinder the ion current i generated in the vicinity of the ignition plug 15 within the ignition device 60 at the time of ignition of the engine 1 to thereby output an ion current detection signal id.

An ion current component detecting means 62 converts the ion current detection signal id into a voltage in correspondence with the current level to thereby output an ion current component signal Vi.

An A/D convertor 63 changes through A/D conversion the ion current component signal Vi into a digital signal.

An ion current processing means 64 detects the absence or presence of knocking or the goodness or badness of the combustion condition on the basis of the ion current level that has been converted into the digital signal.

The ion current processing means 64 is connected to the controlling section 1A through an interface function 65 and inputs as ion current information a combustion state amount F, a knock signal K, and the like on demand from the controlling section 11A.

The operation of the ion current detecting device shown in FIG. 6 will now be described with reference to FIGS. 7 to 10.

Figure 7:
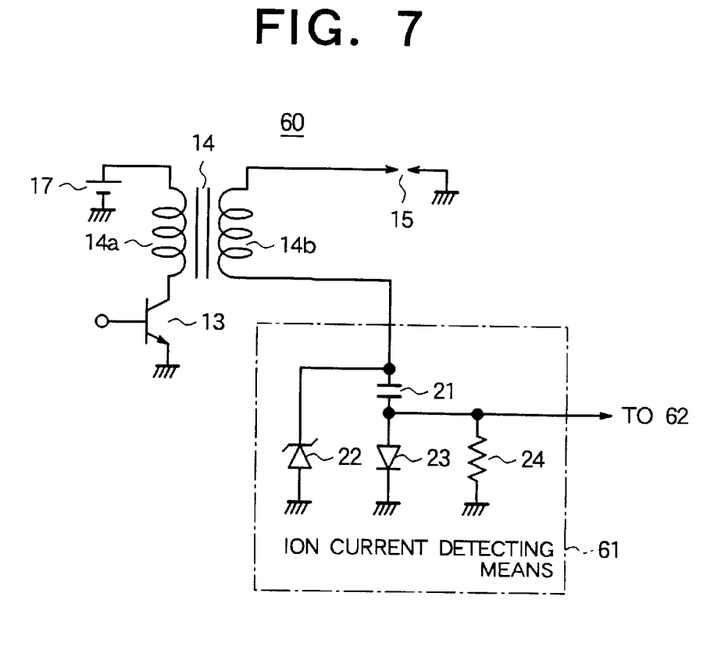
FIG. 7 is a circuit diagram showing an example of the structure of an ion current detecting device in accordance with Embodiment 2 of the present invention.
Figure 8:
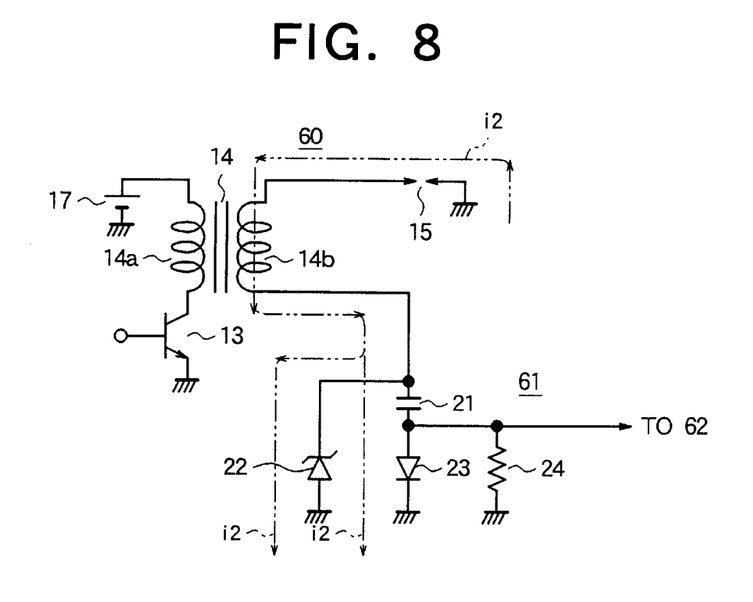
FIG. 8 is a circuit diagram showing the ion current detecting device in accordance with Embodiment 2 of the present invention together with a secondary current path.
Figure 9:
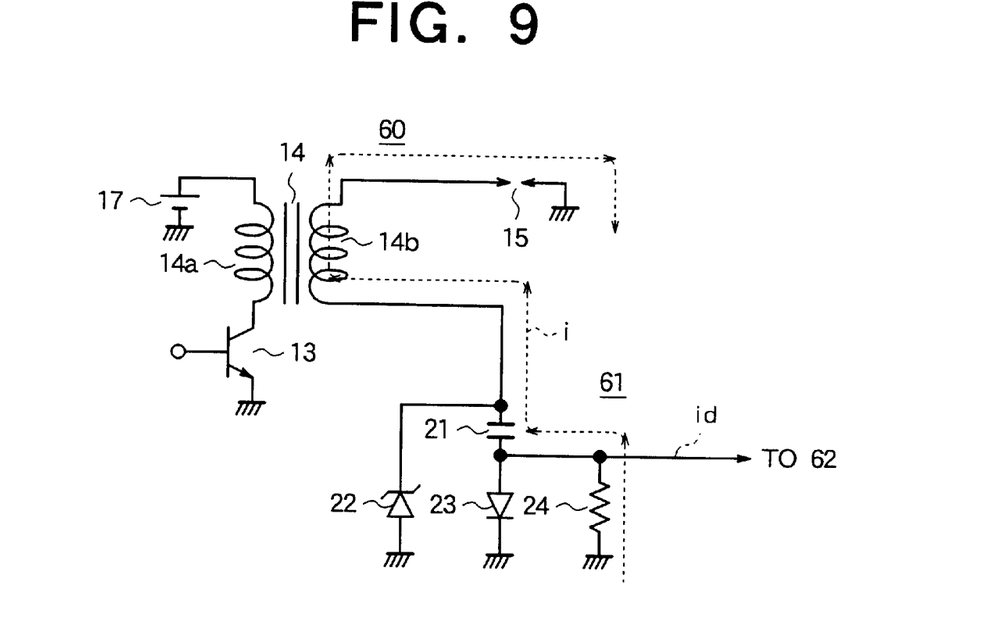
FIG. 9 is a circuit diagram showing the ion current detecting device in accordance with Embodiment 2 of the present invention together with an ion current path.
Figure 10:
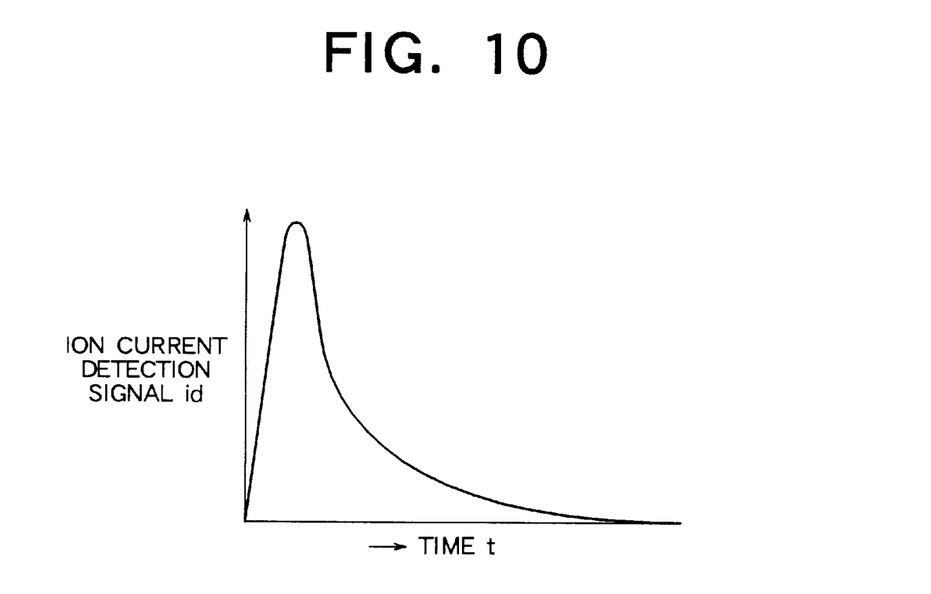
FIG. 10 is a waveform diagram showing an ion current detection signal in accordance with Embodiment 2 of the present invention.

FIGS. 7 to 9 are circuit diagrams showing a specific structure of the ion current detecting means 61, and FIG. 10 is a waveform diagram showing a time-basis change of the ion current detection signal id related to the combustion condition at the time of ignition.

In FIG. 7, the ignition coil 14 is composed of a transformer including a primary coil 14a and a secondary coil 14b.

The igniter 13 composed of a power transistor and the battery 17 are connected to the primary coil 14a of the ignition coil 14.

The ignition plug 15 and the ion current detecting means 61 are connected to the secondary coil 14b.

The primary current flowing through the primary coil 14a by the supply from the battery 17 is supplied or interrupted by the on/off operation of the igniter 13 to generate a high voltage for the ignition to the secondary coil 14b.

The high voltage for ignition is applied so that the secondary current i2 is caused to flow through the ignition plug 15 and the air-fuel mixture within the cylinder (not shown) of the engine 1 is ignited.

In FIGS. 7 to 9, the ignition device 60 for a single cylinder is typically shown but it should be understood that like ignition devices 60 are provided for the respective cylinders.

The ion current detecting means 61 is provided with a capacitor 21 which is a bias power source, a Zener diode 22 connected in parallel with the capacitor 21, a diode 23 connected in series with the capacitor 21 for preventing the reverse flow and a resistor 24 connected in parallel with the diode 23 for ion current detection.

Each one end of the Zener diode 22, the diode 23 and the resistor 24 is grounded.

The capacitor 21 and the Zener diode 22 are connected on the low voltage side of the second coil 14b, and the Zener diode 22 clamps the bias voltage to be charged to the capacitor 21.

Now, at the ignition timing, when the igniter (power transistor) 13 is turned on or off so that the primary current of the ignition coil 14 is interrupted, the high voltage for ignition with negative polarity is generated on the high voltage side of the secondary coil 14b so that the secondary current i2 flows through a discharge path indicated by a two-dot-and-dash arrow in FIG. 8.

Thus, a discharge occurs between the electrodes of the ignition plug 15, the air-fuel mixture in the cylinder of the engine 1 is ignited and at the same time, the capacitor 21 within the ion current detecting means 61 is charged by the secondary current i2.

Incidentally, the charging voltage of the capacitor 21 is set by the Zener diode 22 as desired.

Also, ion is generated in the vicinity of the ignition plug 15 by an ionization effect upon the combustion of the air-fuel mixture.

Subsequently, by the bias voltage with a positive polarity charged in the capacitor 21, electrons are moved so that an ion current i flows along a path indicated by a dotted arrow in FIG. 9.

At this time, the voltage drop generated in the resistor 24 is detected so that the ion current detection signal id representative of the combustion condition of the air-fuel mixture may be obtained as shown in FIG. 10.

Accordingly, it is possible to detect the combustion condition, and the revolution condition and the like of the engine 1 on the basis of, for example, the voltage level of the ion current detection signal id (see FIG. 10). Furthermore, it is possible to detect the initial combustion.

Namely, since the ion current i is not generated so far as the combustion does not occur, a certain standard level is set for the ion current detection signal id, and it is possible to detect the start of the initial combustion of the engine 1 in the case where the ion current detection signal id which is greater than the standard level is obtained.

In this case, the initial combustion detecting means 30A judges that the level of the ion current i is equal to or more than the predetermined value on the basis of the combustion state amount F obtained from the ion current processing means 64.

Thus, by detecting the initial combustion on the basis of the ion current detection signal id by using the known ion current detecting device, it is possible to dispense with the calculation process of the turn-on periodic change of the crank angle signal CA within the initial combustion detecting means 30A. Accordingly, the system may be also simplified.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fuel property judgement apparatus for an internal combustion engine, comprising:

a crank angle sensor for generating a crank angle signal corresponding to an rpm of the internal combustion engine and a crank angle position;

a starter switch for outputting a start signal at the time of starting operation of the internal combustion engine;

an initial combustion detecting means for detecting an initial combustion at the time of starting operation of the internal combustion engine in response to the start signal;

a turn-on number counting means for counting a turn-on number of the crank angle signal during a period from the operation start of the internal combustion engine to the detection of the initial combustion;

a standard number setting means for setting a standard number which is a judgement standard for the fuel property of the internal combustion engine;

a turn-on number comparing means for comparing the turn-on number with the standard number to yield a comparison result; and a fuel property judgement means for determining the fuel property on the basis of the comparison result of said turn-on number comparing means.

2. The fuel property judgement apparatus according to claim 1, wherein said fuel property judgement means determines that the fuel property of the internal combustion engine is of a heavy gasoline type when comparison result of the turn-on number comparing means indicates that the turn-on number is equal to or greater than the standard number, and determines that the fuel property of the internal combustion engine is of a regular gasoline type when the comparison result of the turn-on number comparing means indicates that the turn-on number is smaller than the standard number.

3. The fuel property judgement apparatus according to claim 1, further comprising:

a temperature sensor for detecting a coolant water temperature of the internal combustion engine; and a start temperature judgement means for determining a temperature condition at the time of starting operation of the internal combustion engine on the basis of the start signal and the coolant water temperature, wherein said start temperature judgement means includes:

a standard temperature range setting means for setting a standard temperature range which is a judgement standard for the temperature condition; and a coolant water temperature comparing means for comparing the coolant water temperature at the time of starting operation of the internal combustion engine with the standard temperature range, whereby said start temperature judgement means validates the judgement result of said fuel property judgement means on the basis of the turn-on number when a first comparison result of the coolant water temperature comparing means indicates that the coolant water temperature falls within the standard temperature range.

4. The fuel property judgement apparatus according to claim 3, wherein said start temperature judgement means invalidates the judgement result of said fuel property judgement means on the basis of the turn-on number when a second comparison result of the coolant water temperature comparing means indicates that the coolant water temperature is out of the standard temperature, and judges that the fuel property of the internal combustion engine is of a regular gasoline type.

5. The fuel property judgement apparatus according to claim 3, wherein a lower limit value of the standard temperature range is set to correspond with the coolant water temperature at the time of starting operation when a temperature of an ambient environment is below a predetermined threshold defining extreme cold, and an upper limit value of the standard temperature range is set corresponding to the coolant water temperature at the time of warming-up of the internal combustion engine.

6. The fuel property judgement apparatus according to claim 1, wherein said initial combustion detecting means considers a periodic change of a turn-on timing of the crank angle signal when detecting the internal combustion.

7. The fuel property judgement apparatus according to claim 6, wherein said initial combustion detecting means detects the initial combustion after the periodic change of the turn-on timing of the crank angle signal decreases by a predetermined value.

8. A fuel property judgement apparatus for an internal combustion engine, comprising:
- a crank angle sensor for generating a crank angle signal corresponding to an rpm of the internal combustion engine and a crank angle position;
- a starter switch for outputting a start signal at the time of starting operation of the internal combustion engine;
- an initial combustion detecting means for detecting an initial combustion at the time of starting operation of the internal combustion engine in response to the start signal;
- a turn-on number counting means for counting a turn-on number of the crank angle signal during a period from the operation start of the internal combustion engine to the detection of the initial combustion;
- a standard number setting means for setting a standard number which is a judgement standard for the fuel property of the internal combustion engine;
- a turn-on number comparing means for comparing the turn-on number with the standard number to yield a comparison result;
- a fuel property judgement means for determining the fuel property on the basis of the comparison result of said turn-on number comparing means; and
- an ion current detecting device for detecting an ion current generated in the vicinity of an ignition plug at the time of an ignition control operation of the internal combustion engine, wherein said initial combustion detecting means detects the initial combustion on the basis of the ion current.

9. The fuel property judgement apparatus according to claim 8, wherein said initial combustion detecting means detects the initial combustion in the case where the detection level of the ion current exhibits a predetermined value or more.

* * * * *